US010625688B2

(12) United States Patent
Adamson, Sr. et al.

(10) Patent No.: US 10,625,688 B2
(45) Date of Patent: Apr. 21, 2020

(54) ASSEMBLY CAPABLE OF DEPLOYING AN ELECTRONIC DEVICE HAVING A DISPLAY SCREEN IN A VEHICLE

(71) Applicant: Global IP Holdings LLC, Sterling Heights, MI (US)

(72) Inventors: Richard D. Adamson, Sr., Almont, MI (US); Scott Munro, Clarkston, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 157 days.

(21) Appl. No.: 15/803,939

(22) Filed: Nov. 6, 2017

(65) Prior Publication Data
US 2019/0135192 A1 May 9, 2019

(51) Int. Cl.
*B60R 11/02* (2006.01)
*B60R 16/03* (2006.01)
*B60R 11/00* (2006.01)

(52) U.S. Cl.
CPC ...... *B60R 11/0229* (2013.01); *B60R 11/0235* (2013.01); *B60R 16/03* (2013.01); *B60R 2011/0005* (2013.01); *B60R 2011/0082* (2013.01); *B60R 2011/0085* (2013.01); *B60R 2011/0092* (2013.01)

(58) Field of Classification Search
CPC ............. B60R 11/0235; B60R 11/0252; B60R 11/0229
See application file for complete search history.

(56) References Cited

U.S. PATENT DOCUMENTS

| 5,204,666 | A | * | 4/1993 | Aoki | B60K 37/02 345/9 |
| 6,386,413 | B1 | * | 5/2002 | Twyford | B60R 11/0252 108/138 |
| 6,499,788 | B2 | | 12/2002 | Ito et al. | |
| 7,510,241 | B2 | * | 3/2009 | Nathan | B60K 35/00 297/217.3 |
| 7,735,432 | B2 | * | 6/2010 | Jin | B60R 11/0235 108/147 |
| 7,780,131 | B2 | * | 8/2010 | Oh | F16M 11/10 248/276.1 |

(Continued)

FOREIGN PATENT DOCUMENTS

FR 3025765 A1 * 3/2016 ......... B60R 11/0235

*Primary Examiner* — Eret C McNichols
(74) *Attorney, Agent, or Firm* — Brooks Kushman P.C.

(57) ABSTRACT

An assembly capable of deploying an electronic device having a display screen from a stowed position towards a viewing position and simultaneously supporting the device and supplying electrical signals to the device in the viewing position within a passenger compartment of a vehicle is provided. A device holder is capable of movably holding the device and is supported for rotation about a rotational axis at a distal end of an elongated support. A bi-directional, electrically powered, linear actuator subassembly is mounted on a base and includes a motor-driven screw-drive and a threaded member mounted on the screw-drive to linearly move along a longitudinal axis of the screw-drive upon rotation of the screw-drive. The threaded member is connected to a proximal end of the elongated support to lift the elongated support to deploy the device along a predetermined, non-linear path upon rotation of the screw-drive.

20 Claims, 3 Drawing Sheets

(56) References Cited

U.S. PATENT DOCUMENTS

| | | | | |
|---|---|---|---|---|
| 7,869,129 B2* | 1/2011 | Lebreton | ............... | B60K 35/00 359/632 |
| 7,959,226 B2* | 6/2011 | Hattori | ................... | B60N 2/64 297/188.05 |
| 8,002,179 B2 | 8/2011 | Feit et al. | | |
| 8,072,743 B2 | 12/2011 | Kissel | | |
| 8,077,396 B2* | 12/2011 | Croy | ..................... | B60K 35/00 359/632 |
| 8,844,997 B2 | 9/2014 | Jung | | |
| 8,967,011 B2* | 3/2015 | Lee | ........................ | B60R 11/02 74/425 |
| 8,991,951 B2* | 3/2015 | Lee | ..................... | F16M 11/046 312/319.5 |
| 10,065,572 B2* | 9/2018 | Kuntze | ................. | G09G 3/002 |
| 2007/0290536 A1* | 12/2007 | Nathan | ................. | B60K 35/00 297/217.3 |
| 2008/0156953 A1* | 7/2008 | Oh | ........................ | F16M 11/08 248/284.1 |
| 2009/0085383 A1* | 4/2009 | Hicks | .................... | B60K 35/00 297/217.3 |
| 2009/0086329 A1* | 4/2009 | Potakowskyj | ..... | G02B 27/0149 359/630 |
| 2009/0096941 A1* | 4/2009 | Chen | .................. | B60R 11/0235 348/837 |
| 2009/0159768 A1* | 6/2009 | Oh | ........................ | F16M 11/10 248/284.1 |
| 2009/0174238 A1* | 7/2009 | Kuno | .................. | B60R 11/0235 297/217.3 |
| 2010/0259078 A1* | 10/2010 | Saito | .................. | B60R 11/0235 297/217.3 |
| 2012/0188650 A1* | 7/2012 | Rumpf | ................... | G02B 7/005 359/630 |
| 2013/0279015 A1* | 10/2013 | Ishibashi | ............ | G02B 27/0101 359/630 |
| 2014/0085787 A1* | 3/2014 | Kato | ................... | B60R 11/0235 361/679.01 |
| 2014/0320382 A1* | 10/2014 | Moussa | .............. | G02B 27/0149 345/7 |
| 2014/0368097 A1* | 12/2014 | Yomogita | .......... | G02B 27/0149 312/23 |
| 2015/0116837 A1* | 4/2015 | Yamada | ................. | B60K 35/00 359/632 |
| 2015/0323794 A1* | 11/2015 | Mikami | ............. | G02B 27/0149 359/630 |
| 2016/0193923 A1* | 7/2016 | Kim | ..................... | B60K 35/00 296/70 |
| 2016/0340041 A1* | 11/2016 | Peuziat | ............. | B64D 11/0015 |
| 2017/0322760 A1* | 11/2017 | Soh | ................... | B60R 11/0235 |
| 2018/0201204 A1* | 7/2018 | Saitou | .................... | B60K 35/00 |
| 2019/0193644 A1* | 6/2019 | Amano | ............... | B60R 11/0235 |
| 2019/0255945 A1* | 8/2019 | Yamazaki | ............. | B60K 35/00 |

\* cited by examiner

ASSEMBLY CAPABLE OF DEPLOYING AN ELECTRONIC DEVICE HAVING A DISPLAY SCREEN IN A VEHICLE

TECHNICAL FIELD

At least one embodiment of the present invention generally relates to assemblies capable of deploying an electronic device having a display screen in a vehicle.

BACKGROUND

As described in U.S. Pat. No. 6,499,788, a conventional automotive display device may be installed in a dashboard portion of an automotive vehicle. An automotive display device comprising a pop-up type display unit may be supported so as emerge from and submerge into the interior of the dashboard portion by means of a predetermined movable mechanism, and in such a display device the display unit is often adapted to pop up from the interior of the dashboard portion only when it is in use in consideration of design or protection against dust.

As described in U.S. Pat. No. 8,844,997, in modern motor vehicles, a display screen is frequently provided in the area of the dashboard, which is used as an output interface of an onboard computer for displaying manifold environmental and operating variables, such as the outside temperature, the fuel consumption, etc. Additionally, or alternatively, such a display screen is frequently also used as an output device of a navigation system, automobile radio, etc. If a touch sensitive display screen (touch screen) is used or if separate operating elements are assigned to a display which is not touch sensitive per se, such a display screen can also be provided as an input interface for the onboard computer, the navigation system, or the automobile radio. Display screens are also used in the rear area of the vehicle interior, where they are primarily part of a multimedia entertainment system.

U.S. Pat. No. 8,072,743 discloses an on-board monitor device for a motor vehicle, having a monitor which can be moved in a driven fashion by means of a drive mechanism from an inactive position in a recess in a dashboard through an opening in the recess into an active position outside the recess, and from the above position into the inactive position, wherein furthermore a cover which closes the opening in the inactive position can be moved in a driven fashion, coupled in terms of movement, by the drive mechanism into a position which clears the opening in the active position.

U.S. Pat. No. 8,002,179 discloses a console display assembly that uses a mechanical positioning mechanism to adjust a display member between a hidden position and a visible position. The '179 patent states that the use of a motor to make adjustment adds complexity and expense to the display.

The term 'bus' and variations thereof, as used herein, refers to a subsystem that transfers information and/or data between various components. A bus generally refers to the collection communication hardware interface, interconnects, bus architecture, and/or protocol defining the communication scheme for a communication system and/or communication network. A bus may also be specifically referred to as a part of communication hardware that interfaces the communication hardware with the interconnects that connect to other components of a corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

The term "vehicle", as used herein, includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The terms "head unit," "dash," "dashboard," "instrument panel," and variations thereof, as used herein, are used interchangeably and include any panel and/or area of a vehicle disposed adjacent to an operator, user, and/or passenger. Typical dashboards may include but are not limited to one or more control panel, instrument housing, head unit, indicator, gauge, meter, light, audio equipment, computer, screen, display, HUD unit, and graphical user interface.

The term "display" as used herein, refers to a portion of a screen used to display the output of a computer to a user.

The term "display orientation," as used herein, refers to the way in which a rectangular display is oriented by a user for viewing. The two most common types of display orientation are portrait and landscape. In landscape more, the display is oriented such that the width of the display is greater than the height of the display (such as 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical. The multi-screen display can have one composite display that encompasses all the screens. The composite display can have different display characteristics based on the various orientations of the device.

The term "gesture recognition" or "gesture capture," as used herein, refers to a sense or otherwise a detection of an instance and/or type of user gesture. The gesture capture can occur in one or more areas of the screen. A gesture region can be on the display, where it may be referred to as a touch sensitive display or off the display where it may be referred to as a gesture capture area.

A "multi-screen application," as used herein, refers to an application that is capable of producing one or more windows that may simultaneously occupy multiple screens. A multi-screen application commonly can operate in single-screen mode in which one or more windows of the application are displayed only on one screen or in multi-screen mode in which one or more windows are displayed simultaneously on multiple screens.

A "single-screen application" as used herein, refers to an application that is capable of producing one or more windows that may occupy only a single screen at a time.

The term "touch screen," or "touchscreen," as used herein, references to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen and the acoustic wave is disturbed by user contact. A receiving transducer detects the user contact instance and determines the contacted location coordinates.

The term "window" refers to a, typically rectangular, displayed image on at least part of a display that contains or provides content different from the rest of the screen. The window may obscure the desktop.

Despite the above prior art there is a need for a low-cost, compact, assembly capable of deploying an electronic device having a display screen in a vehicle.

SUMMARY OF EXAMPLE EMBODIMENTS

An object of at least one embodiment of the present invention is to provide a low-cost, compact assembly capable of deploying an electronic device having a display screen in a vehicle.

In carrying out the above object and other objects of at least one embodiment of the invention, an assembly capable of deploying an electronic device having a display screen from a stowed position towards a viewing position and simultaneously supporting the device and supplying electrical signals to the device in the viewing position within a passenger compartment of a vehicle is provided. The assembly includes a base adapted to be coupled to a component of the vehicle and an elongated support having a proximal end, an intermediate portion extending from the proximal end and a distal end supported by and extending from the intermediate portion. A device holder is capable of movably holding the device and is supported for rotation about a rotational axis at the distal end of the elongated support. A bi-directional, electrically powered, linear actuator subassembly is mounted on the base and includes a motor-driven screw-drive and a threaded member mounted on the screw-drive to linearly move along a longitudinal axis of the screw-drive upon rotation of the screw-drive. The threaded member is connected to the proximal end of the elongated support to lift the elongated support to deploy the device along a predetermined, non-linear path upon rotation of the screw-drive in a first direction from the stowed position to the viewing position based on a deployment command signal.

The assembly may further include a hinge arm subassembly supported for rotation by the base about a second rotational axis. The device holder may be supported for rotation by the hinge arm subassembly about a third rotational axis during movement of the device holder along the predetermined non-linear path.

The screw-drive may include a lead screw.

The subassembly may include a reversible electric motor mounted on the base and which drives the lead screw.

The subassembly may include an electric motor and wherein the subassembly is configured to rotate and translate the device holder to the viewing position along the non-linear path.

The predetermined non-linear path may be an elliptical path.

The assembly may further include an actuator slide to guide linear motion of the elongated support.

The actuator slide may include at least one guide rod positioned substantially parallel to the longitudinal axis wherein the elongated support is driven along the at least one guide rod.

The holder may be apertured and the support may be hollow to allow electric wiring to supply electrical power to the device from a power source.

The rotational axes may be substantially parallel to each other.

The linear actuator subassembly may retract the device holder upon rotation of the screw-drive in a second direction opposite the first direction from the viewing position towards the stowed position based on a retraction command signal.

Further in carrying out the above object and other objects of at least one embodiment of the invention, an assembly capable of deploying an electronic device having a display screen from a stowed position below an instrument panel towards a viewing position above the instrument panel and simultaneously supporting the device and supplying electrical signals to the device in the viewing position within a passenger compartment of a vehicle is provided. The assembly includes a base adapted to be coupled to a component of the vehicle and an elongated support having a proximal end, an intermediate portion extending from the proximal end and a distal end supported by and extending from the intermediate portion. A device holder is capable of movably holding the device and is supported for rotation about a rotational axis at the distal end of the elongated support. A bi-directional, electrically powered, linear actuator subassembly is mounted on the base and includes a motor-driven screw-drive and a threaded member mounted on the screw-drive to linearly move along a longitudinal axis of the screw-drive upon rotation of the screw-drive. The threaded member is connected to the proximal end of the elongated support to lift the elongated support to deploy the device along a predetermined, non-linear path upon rotation of the screw-drive in a first direction from the stowed position to the viewing position based on a deployment command signal.

The assembly may further include a hinge arm subassembly supported for rotation by the base about a second rotational axis. The device holder may be supported for rotation by the hinge arm subassembly about a third rotational axis during movement of the device holder along the predetermined non-linear path.

The screw-drive may include a lead screw.

The subassembly may include a reversible electric motor mounted on the base and which drives the lead screw.

The subassembly may include an electric motor wherein the subassembly may be configured to rotate and translate the device holder to the viewing position along the non-linear path.

The predetermined non-linear path may be an elliptical path.

The assembly may further include an actuator slide to guide linear motion of the elongated support.

The actuator slide may include at least one guide rod positioned substantially parallel to the longitudinal axis wherein the elongated support is driven along the at least one guide rod.

The holder may be apertured and the support may be hollow to allow electrical wiring to supply electrical power to the device from a power source.

The rotational axes may be substantially parallel to each other.

The linear actuator subassembly may retract the device holder upon rotation of the screw-drive in a second direction opposite the first direction from the viewing position towards the stowed position based on a retraction command signal.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
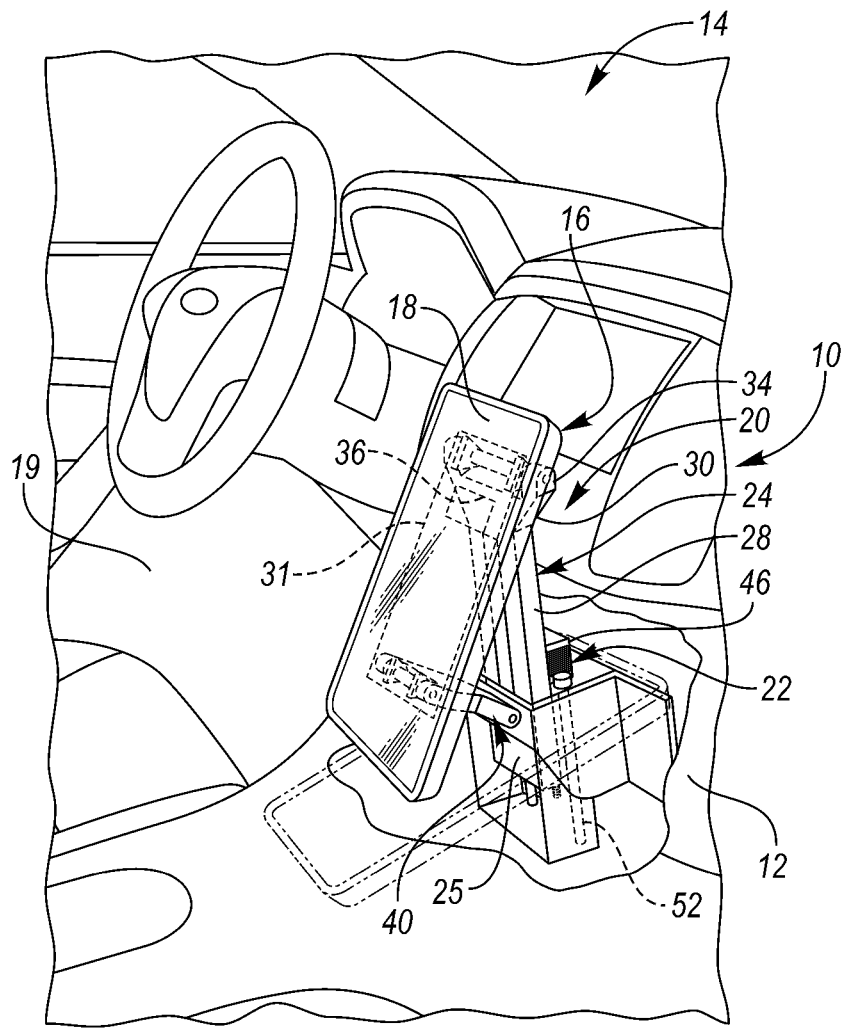
FIG. 1a is a schematic, perspective, environmental view, partially broken away, of an assembly which is shown in its deployed position to allow a driver of a vehicle to view what is being displayed on a display screen of an electronic device.
Figure 1B:
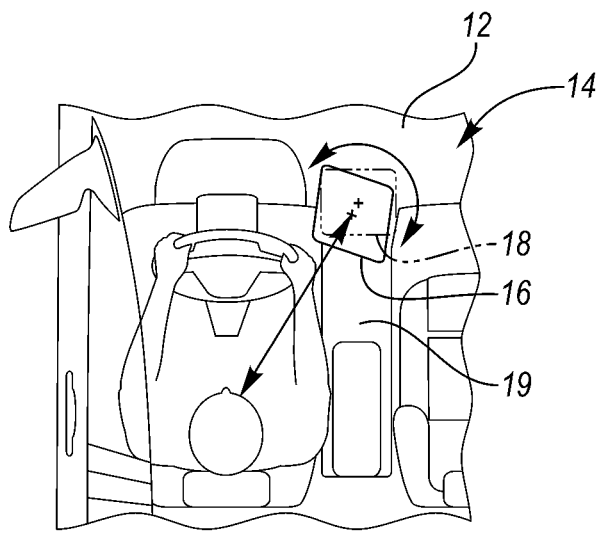
FIG. 1b is a top schematic view, partially broken away, of the assembly of FIG. 1a to show a viewing angle for the driver and an adjustment of the assembly.

Referring now to the drawing figures, there is illustrated first embodiment of an assembly, generally indicated at 10, which is in capable of deploying an electronic device 16 having a display screen 18 from a stowed position below an instrument panel 12 of a vehicle 14 through an aperture 13 in the panel 12 and towards a viewing position as shown in FIGS. 1a and 1b while simultaneously supporting the device 16 and supplying electrical signals via wires (not shown) to the device 16 in the viewing position within a passenger compartment 19 of the vehicle 14.

The assembly 10 includes a base 21 (FIG. 2) having fastener holes 23 which receive bolts (not shown) to fasten the assembly 10 to a frame member (not shown) of the vehicle 14. The assembly 10 includes an elongated hollow support 24 having a proximal end 25, an intermediate portion 28 extending from the proximal end 25 and a distal end 30 supported by and extending from the intermediate portion 28.

A device holder 31 is capable of movably holding the device 16 and is supported for rotation about a rotational axis 32 at the distal end 30 of the elongated support 24 via a hinge 34.

Figure 2:
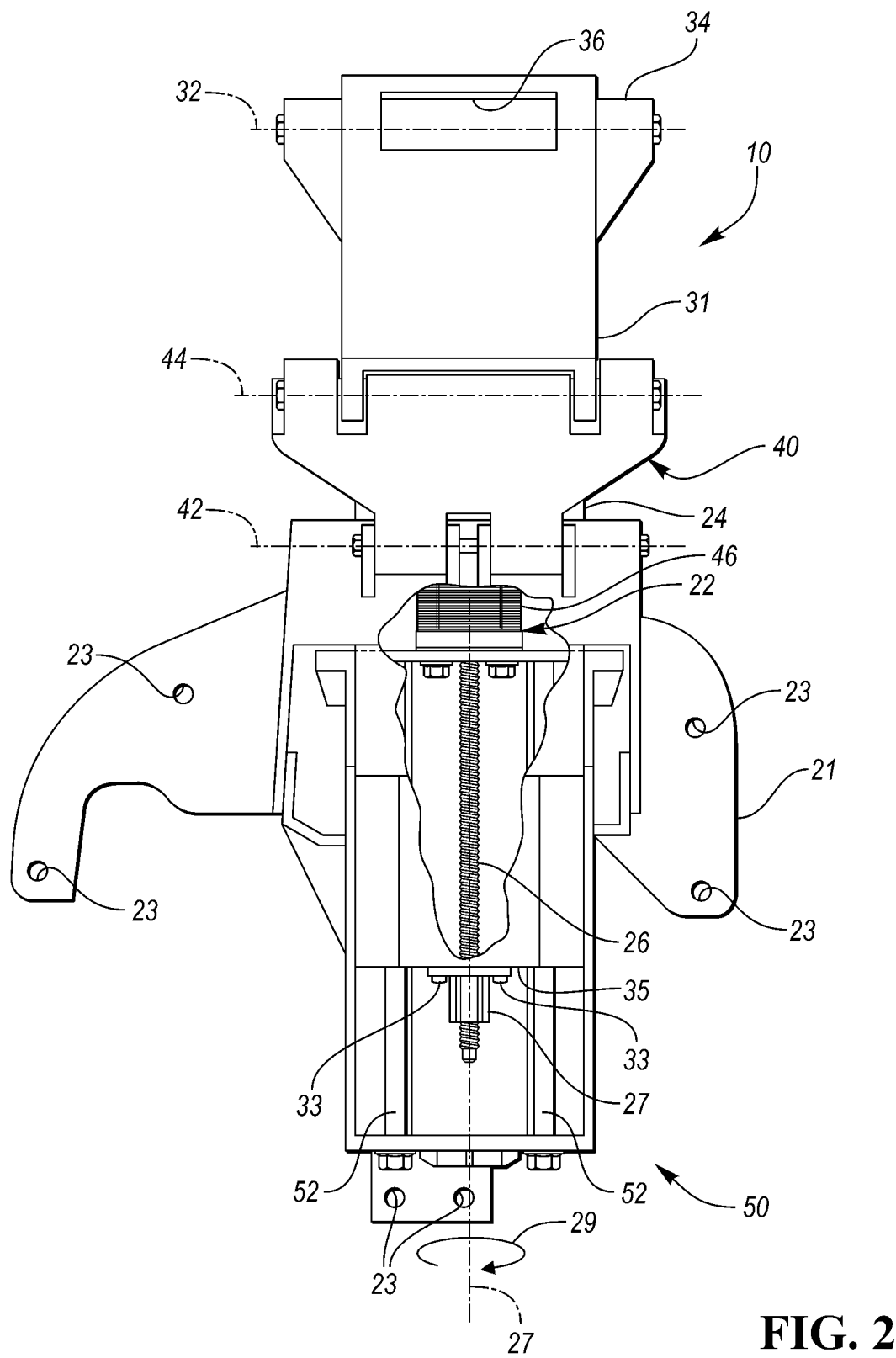
FIG. 2 is a front view, partially broken away, of various parts of the assembly of FIGS. 1a and 1b.

A bi-directional, electrically-powered, linear actuator subassembly, generally indicated at 22, is mounted on the base 21 and includes a motor-driven screw-drive or load screw 26 and a threaded member 27 mounted on the screw-drive 26 to linearly move along a longitudinal axis 27 of the screw-drive 26 upon rotation of the screw-drive 26 as indicated by arrow 29 in FIG. 2. The member 27 is fixed to a bracket 35 by screws 33 so movement of the member 27 moves the bracket 31 which, in turn, moves the support 24 to which the bracket 31 is connected.

In other words, the threaded member 27 is connected to the proximal end 25 of the elongated support 24 through the bracket 35 to lift the elongated support 24 to deploy the device 16 along a predetermined, non-linear path upon rotation of the screw-drive 26 in a first direction from the stowed position to the viewing position of FIGS. 1a and 1b based on a deployment command signal from a controller (not shown).

The assembly 10 may further include a hinge arm subassembly, generally indicated at 40, supported for rotation by the base 21 via a hinge about a second rotational axis 42. The device holder 31 may be supported for rotation by the hinge arm subassembly 40 about a third rotational axis 44 during movement of the device holder 31 along the predetermined non-linear path. In the second embodiment of FIGS. 3 and 4, the hinge arm subassembly 40' may include a pair of arms 41' hingedly connected to both the device holder 31' and the base 21 via arm members 43'.

The subassembly 22 may include a reversible electric motor 46 mounted on the base 21 and which drives the lead screw 26. The subassembly 22 may be configured to rotate and translate the device holder 31 to the viewing position from its stowed position along the non-linear path which may be an elliptical path.

The assembly 10 may further include an actuator slide, generally individual at 50, to guide linear motion of the elongated support 28. The actuator slide 50 may include at least one and preferably two guide rods 52 positioned substantially parallel to the longitudinal axis 27. The elongated support 28 is driven along the guide rods 52.

The holder 31 may be apertured 36 and the support 28 may be hollow to allow electric wiring (not shown) to supply electrical power to the device 16 from a power source (not shown).

The rotational axes 32, 44 and 42 may be substantially parallel to each other.

The linear actuator subassembly 22 may retract the device holder 30 upon rotation of the screw-drive 26 in a second direction opposite the first direction from the viewing position towards the stowed position based on a retraction command signal received by the motor 46 from the motor controller.

Figure 3:
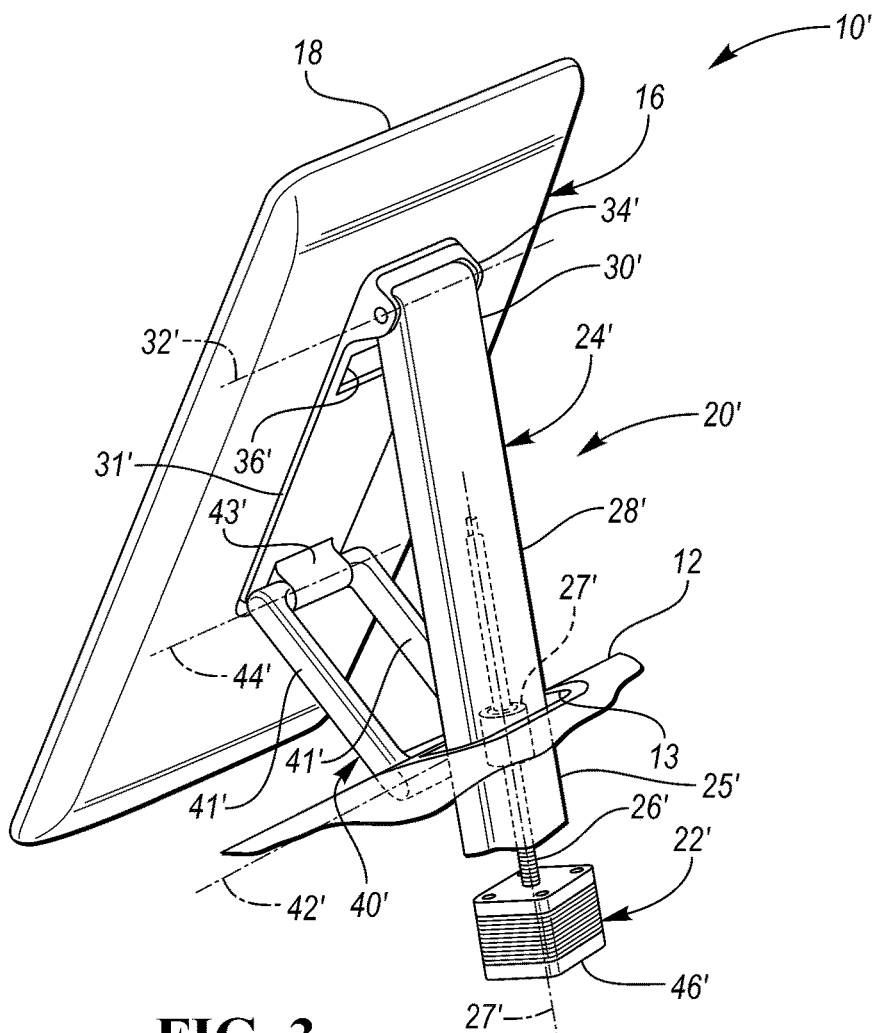
FIG. 3 is a back, schematic, perspective view, partially broken away, of various parts of a second embodiment of the assembly.
Figure 4:
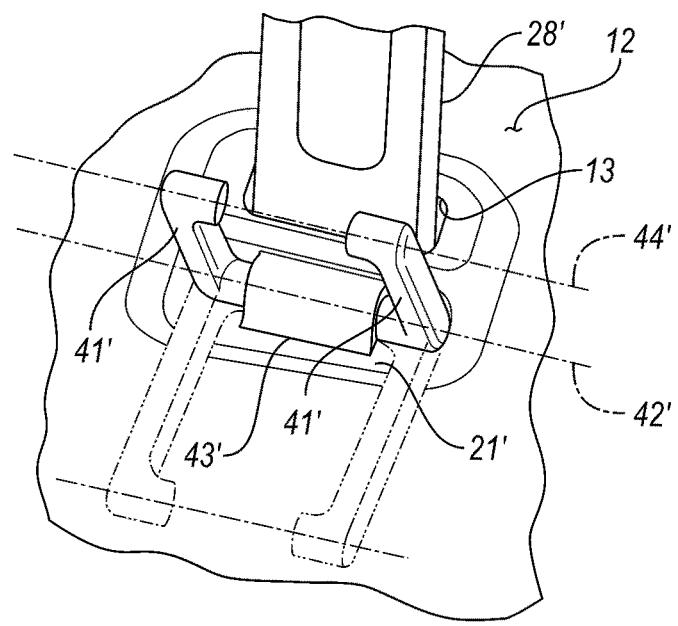
FIG. 4 is an enlarged view, partially broken away, showing different positions of a hinge subassembly of the assembly of FIG. 3.

FIGS. 3 and 4 show a second embodiment of an assembly 10' which is capable of deploying the electronic device 16. Parts of the second embodiment which are either the same or similar in structure and/or function to the parts of the first embodiment have the same reference number but a single prime designation and, consequently, are not specifically described herein.

Both the assembly 10 and the assembly 10' are suitable for use with an automobile, which can be any passenger vehicle used for land transportation, such as a car, minivan, truck, etc. According to alternative embodiments, the assembly 10 or 10' may be used with any type of vehicle, such as water vehicles, air vehicles, etc.

The assembly 10 or the assembly 10' may be electrically connected to a main controller of an electrical system of the vehicle. The main controller is typically electrically connected to one or more switches and/or one or more sensors so that the assembly can be manually or automatically operated to turn on the assembly. For example, the main controller can be electrically connected to an ignition switch, a light sensor, a headlight switch and/or an interior light switch as needed and/or desired.

The motor driver or controller may be coupled to the main controller of the vehicle. The driver may comprise one or more analog and/or digital electrical or electronic components, and may include a microprocessor, microcontroller, application-specific integrated circuit (ASIC), programmable logic, and/or other circuit elements. According to an exemplary embodiment, the driver may be configured to receive data via one or more electrical wires or buses such as the leads from a plurality of automobile systems within the automobile. For example, the driver can be configured to receive data from sensors on the automobile.

In one exemplary embodiment, the motor driver may have a power source and control circuitry to operate the motor. The driver may be an LIN driver including a LIN transceiver, a LIN protocol/controller and a microcontroller (MCU).

The ECU of the vehicle and the motor driver or controller are typically connected via a vehicle bus such as a local interconnect network (LIN or CAN) line or bus capable of two-way communications. LIN is one of many possible in-vehicle local area network (LAN) communications protocols. A power line and a ground line may be provided between the ECU and the controller (via leads). The controller typically includes a transceiver interface within the MCU, a microprocessor and its control logic within the MCU, the drive or driver, and an electrical power source. The controller may be integrated or physically coupled with the motor in the motor housing, while the ECU is provided some distance away from the motor housing.

The power source or circuit of the controller supplies electric power of predetermined voltage levels to the MCU through the drive or driver. The transceiver within the MCU is a communications interface circuit connected to the network or vehicle bus for communications and operates as a receiver section for the MCU and a transmitter section back to the ECU. The driver typically includes the driver circuit for driving the motor.

The MCU of the driver typically includes a memory and may be configured as a conventional microcomputer including a CPU, a ROM, a RAM and the like or as a hardwired logic circuit.

The ECU and the controller may perform data communications regularly through the LIN or CAN bus. In such data communications, the controller or driver may transmit state data indicating the state of the motor to the ECU.

The ECU and/or the controller may confirm the desired state of the motor. The state of the ECU is based on various states detected by non-contact position sensor(s), commands and the present state of the motor to generate commands.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. An assembly capable of deploying an electronic device having a display screen from a stowed position towards a viewing position and simultaneously supporting the device and supplying electrical signals to the device in the viewing position within a passenger compartment of a vehicle, the assembly comprising:
   a base adapted to be coupled to a component of the vehicle;
   an elongated support having a proximal end, an intermediate portion extending from the proximal end and a distal end supported by and extending from the intermediate portion;
   a device holder capable of movably holding the device and supported for rotation about a rotational axis at the distal end of the elongated support;
   a bi-directional, electrically powered, linear actuator subassembly mounted on the base and including a motor-driven screw-drive and a threaded member mounted on the screw-drive to linearly move along a longitudinal axis of the screw-drive upon rotation of the screw-drive, the threaded member being connected to the proximal end of the elongated support to lift the elongated support to deploy the device along a predetermined, non-linear path upon rotation of the screw-drive in a first direction from the stowed position to the viewing position based on a deployment command signal; and
   a hinge arm subassembly supported for rotation by the base about a second rotational axis, the device holder being supported for rotation by the hinge arm subassembly about a third rotational axis during movement of the device holder along the predetermined non-linear path.

2. The assembly as claimed in claim 1 wherein the screw-drive includes a lead screw.

3. The assembly as claimed in claim 2 wherein the subassembly includes a reversible electric motor mounted on the base and which drives the lead screw.

4. The assembly as claimed in claim 1 wherein the subassembly includes an electric motor and wherein the subassembly is configured to rotate and translate the device holder to the viewing position along the non-linear path.

5. The assembly as claimed in claim 1 wherein the predetermined non-linear path is an elliptical path.

6. The assembly as claimed in claim 1 further comprising an actuator slide to guide linear motion of the elongated support.

7. The assembly as claimed in claim 6 wherein the actuator slide includes at least one guide rod positioned substantially parallel to the longitudinal axis wherein the elongated support is driven along the at least one guide rod.

8. The assembly as claimed in claim 1 wherein the rotational axes are substantially parallel to each other.

9. The assembly as claimed in claim 1 wherein the linear actuator subassembly retracts the device holder upon rotation of the screw-drive in a second direction opposite the first direction from the viewing position towards the stowed position based on a retraction command signal.

10. An assembly capable of deploying an electronic device having a display screen from a stowed position towards a viewing position and simultaneously supporting the device and supplying electrical signals to the device in the viewing position within a passenger compartment of a vehicle, the assembly comprising:
- a base adapted to be coupled to a component of the vehicle;
- an elongated support having a proximal end, an intermediate portion extending from the proximal end and a distal end supported by and extending from the intermediate portion;
- a device holder capable of movably holding the device and supported for rotation about a rotational axis at the distal end of the elongated support; and
- a bi-directional, electrically powered, linear actuator subassembly mounted on the base and including a motor-driven screw-drive and a threaded member mounted on the screw-drive to linearly move along a longitudinal axis of the screw-drive upon rotation of the screw-drive, the threaded member being connected to the proximal end of the elongated support to lift the elongated support to deploy the device along a predetermined, non-linear path upon rotation of the screw-drive in a first direction from the stowed position to the viewing position based on a deployment command signal wherein the holder is apertured and the support is hollow to allow electric wiring to supply electrical power to the device from a power source.

11. An assembly capable of deploying an electronic device having a display screen from a stowed position below an instrument panel towards a viewing position above the instrument panel and simultaneously supporting the device and supplying electrical signals to the device in the viewing position within a passenger compartment of a vehicle, the assembly comprising:
- a base adapted to be coupled to a component of the vehicle;
- an elongated support having a proximal end, an intermediate portion extending from the proximal end and a distal end supported by and extending from the intermediate portion;
- a device holder capable of movably holding the device and supported for rotation about a rotational axis at the distal end of the elongated support;
- a bi-directional, electrically powered, linear actuator subassembly mounted on the base and including a motor-driven screw-drive and a threaded member mounted on the screw-drive to linearly move along a longitudinal axis of the screw-drive upon rotation of the screw-drive, the threaded member being connected to the proximal end of the elongated support to lift the elongated support to deploy the device along a predetermined, non-linear path upon rotation of the screw-drive in a first direction from the stowed position to the viewing position based on a deployment command signal; and
- a hinge arm subassembly supported for rotation by the base about a second rotational axis, the device holder being supported for rotation by the hinge arm subassembly about a third rotational axis during movement of the device holder along the predetermined non-linear path.

12. The assembly as claimed in claim 11 wherein the screw-drive includes a lead screw.

13. The assembly as claimed in claim 12 wherein the subassembly includes a reversible electric motor mounted on the base and which drives the lead screw.

14. The assembly as claimed in claim 11 wherein the subassembly includes an electric motor and wherein the subassembly is configured to rotate and translate the device holder to the viewing position along the non-linear path.

15. The assembly as claimed in claim 11 wherein the predetermined non-linear path is an elliptical path.

16. The assembly as claimed in claim 11 further comprising an actuator slide to guide linear motion of the elongated support.

17. The assembly as claimed in claim 16 wherein the actuator slide includes at least one guide rod positioned substantially parallel to the longitudinal axis wherein the elongated support is driven along the at least one guide rod.

18. The assembly as claimed in claim 11 wherein the rotational axes are substantially parallel to each other.

19. The assembly as claimed in claim 11 wherein the linear actuator subassembly retracts the device holder upon rotation of the screw-drive in a second direction opposite the first direction from the viewing position towards the stowed position based on a retraction command signal.

20. An assembly capable of deploying an electronic device having a display screen from a stowed position below an instrument panel towards a viewing position above the instrument panel and simultaneously supporting the device and supplying electrical signals to the device in the viewing position within a passenger compartment of a vehicle, the assembly comprising:
- a base adapted to be coupled to a component of the vehicle;
- an elongated support having a proximal end, an intermediate portion extending from the proximal end and a distal end supported by and extending from the intermediate portion;
- a device holder capable of movably holding the device and supported for rotation about a rotational axis at the distal end of the elongated support; and
- a bi-directional, electrically powered, linear actuator subassembly mounted on the base and including a motor-driven screw-drive and a threaded member mounted on the screw-drive to linearly move along a longitudinal axis of the screw-drive upon rotation of the screw-drive, the threaded member being connected to the proximal end of the elongated support to lift the elongated support to deploy the device along a predetermined, non-linear path upon rotation of the screw-drive in a first direction from the stowed position to the viewing position based on a deployment command signal wherein the holder is apertured and the support is hollow to allow electrical wiring to supply electrical power to the device from a power source.

* * * * *